UNITED STATES PATENT OFFICE.

FREDERIC A. EUSTIS, OF MILTON, MASSACHUSETTS, ASSIGNOR OF THREE-FOURTHS TO CHARLES PAGE PERIN, OF NEW YORK, N. Y.

TREATMENT OF IRON ORES.

1,377,822. Specification of Letters Patent. Patented May 10, 1921.

No Drawing. Application filed April 27, 1920. Serial No. 377,006.

*To all whom it may concern:*

Be it known that I, FREDERIC A. EUSTIS, a citizen of the United States of America, and resident of Milton, in the county of Norfolk and State of Massachusetts, have invented new and useful Improvements in the Treatment of Iron Ores, of which the following is a specification.

This invention relates to the treatment of iron ore, and particularly fine iron ore, and its principal object is to produce an electrolytic iron direct from the ore, without sintering or smelting and often without roasting. Other objects are to produce artificial gypsum as a by-product, and also certain incidental metals, such as aluminum, manganese, nickel and chromium if these metals are present in the ore.

The word "gypsum" as used throughout the specification and claims denotes an artificially prepared gypsum which has the same chemical symbol ($CaSO_4 + 2H_2O$) and the same crystalline form as gypsum found in nature.

The invention is well adapted to the treatment of such ores as the soft iron ores of the north coast of the Island of Cuba, which occur as blanket deposits on top of the rocks forming that part of the island. The ores consist essentially of oxids and silicates of iron and aluminum, and contain also small amounts of nickel, manganese and chromium together with much water. Such ores have the advantage for the present process that they do not have to be ground. But the process is also applicable to other fine ores, as well as said Cuban ores, whether they are fine in nature or are made fine by grinding. Such ores as the Cuban ores can be treated by the present method without roasting. If, however, the ore does not yield readily to the solvent it may be given a preliminary suitable roast to make the iron and other incidental metals aluminum, manganese and nickel, if present, readily soluble.

The finely divided ore is first leached in a suitable lixiviating vat. The solution used is preferably a weak solution of hydrochloric acid, or a mixture of hydrochloric acid and sulfuric acid, but other suitable solvents which will act as an electrolyte at a later stage of the process may be used.

The leaching step yields on the one hand a liquor containing in solution iron salts and also aluminum salts, and nickel and manganese if the latter metals were present in the ore; and on the other hand a residue consisting of substantially all the silica and substantially all the chromium (if present) together with small amounts of undissolved iron and small amounts of the other metals if present. The residue may be treated as waste, or used as a source of chromium if desired.

The liquor is now subjected to a reducing treatment. This can well be done by adding $SO_2$ gas in the presence of calcium carbonate ($CaCO_3$) in the manner more fully set forth in my application for Letters Patent of the United States filed November 3, 1919, Serial Number 335,453; but any other economical method of reducing the solution may be used.

After the reduction step any calcium sulfate which may have been precipitated should be filtered out in order to make a clear liquor. Calcium sulfite is soluble and will stay in the liquor, but calcium sulfate is insoluble and should be removed.

Finely ground limestone, or calcium carbonate ($CaCO_3$) is then added to the reduced and filtered liquor in sufficient quantity to precipitate substantially all of the alumina. Any ferric iron present will come down with the alumina; but there will be only slight traces, if any, of ferric iron, and the amount may be further minimized by the addition at this step of a small amount of sulfur dioxid ($SO_2$) to supplement the sulfur dioxid already present in the solution from the reduction step. The rest of the iron in the solution is ferrous iron which is thoroughly reduced, and will not be precipitated by the calcium carbonate.

The precipitate from the last step is suitable material for treatment by the Bayer process or otherwise to produce pure aluminum oxid; while the liquor contains salts of ferrous iron and lime and of such of the other metals, nickel or manganese as may have been present in the ore.

Into this solution there is then introduced a solution of ferrous sulfate ($FeSO_4$) sufficient in quantity to precipitate the lime present as calcium sulfate ($CaSO_4 2H_2O$) or gypsum. The ferrous sulfate used at this step may be obtained from any suitable source but is preferably produced as hereinafter described by treatment of some of the same kind of ore which is being treated in the main process.

The calcium sulfate thus precipitated out may be worked up and marketed as gypsum.

The liquor, now containing salts of ferrous iron, and of manganese and nickel if present, is then concentrated in an evaporator, if desired, to reduce the quantity of water; and the concentrated liquor is then subjected to an electrolytic treatment. Metallic iron will be precipitated in the electrolytic apparatus at the cathode and manganese (if present) will be precipitated at the anode as a dioxid. The precipitation will not be carried to completion but when a slight amount of acidity has been built up by the reaction in the electrolytic apparatus, the electrolyte will be returned to the ore vat at the first stage to be used as a solvent, and added to the leach liquor, thus completing the cycle. The electrolyte so returned will again pass through the process and be again subjected to the treatments already described.

As an alternative method to the treatment of all of the solution resulting from the leaching step for the purpose of precipitating alumina, the solution may be divided into two parts before the precipitation of the alumina by calcium carbonate, and preferably after the reduction step. One part may be treated as already described for precipitating alumina and recovering gypsum, while the other part may be carried direct to the electrolytic cell where it is reunited with the part of the liquor from which the aluminum has been precipitated. Thus part of the solution is short-circuited around those steps by which alumina and gypsum are produced, and is subjected directly to the electrolytic treatment. The steps of recovering alumina and gypsum are not essential to the recovery of iron, and the main purpose of those steps (apart from the recovery of alumina and gypsum for their own sake) is to avoid an excessive amount of alumina in the solution—too much alumina is troublesome in the later treatment while a little may even be advantageous. Therefore, it is not necessary that the alumina should be removed from all of the solution before the electrolytic treatment. The omission to treat part of the solution for the recovery of alumina will prove advantageous and economical particularly when the volume of liquor is very large.

If the ore is one which requires considerable acidity in the solvent it may be desirable to use an electrolytic cell with a diaphragm to keep the acid formed at the anode away from the cathode. If a very slightly acid solvent will suffice this may not be necessary.

Again, with some ores it will be advantageous to use two reduction steps in each cycle; one after the leaching of the ore as already described, and another between the electrolytic step and the leaching step to reduce the electrolyte. If the reduction of the electrolyte is performed in a reduction tower such as described in my said application filed November 13, 1919, Ser. No. 335,453, acid will be generated from the sulfur dioxid in the process of reduction. The acidity of the electrolyte may be increased in this manner two per cent. or more.

If nickel is present in the ore it will be dissolved in the leaching step with the iron, and with alumina and manganese, if present, and will be precipitated in the cathode part of the electrolytic cell either as an alloy with the iron or as a sludge, depending on the detail control of the electrolytic operation.

The ferrous sulfate added to the solution after the precipitation of the alumina, may as already stated be obtained from any suitable source, but it can conveniently be made by leaching some of the ore with a strong solution of $SO_2$ in water. This leaching yields a residue of silica and of chromium, if present in the ore, and a solution of ferrous sulfate ($FeSO_4$) together with sulfates of aluminum, manganese and nickel if those metals are present in the ore. The small amount of aluminum, if any, introduced at this stage will be returned with the solution to the original leach liquor, and will come out in the next cycle.

The residue from this leaching step for making ferrous sulfate, or the residue from the first leaching step of the main process, may either of them, in case it is unduly foul with iron, be put back into one of the leaching vats for retreatment to clean up the iron.

I claim:

1. The method of treating an iron ore containing alumina, comprising dissolving the iron and alumina out of the ore with a suitable solvent, precipitating the alumina by the addition of a suitable chemical reagent, and precipitating the iron by electrolysis.

2. The method of treating an iron ore containing alumina, comprising dissolving the iron and alumina out of the ore with a suitable solvent, reducing the solution, precipitating the alumina by the addition of a suitable chemical reagent, and precipitating the iron by electrolysis.

3. The method of treating an iron ore containing alumina, comprising dissolving the iron and alumina out of the ore with a suitable solvent, precipitating the alumina by the addition of a suitable chemical reagent, precipitating part of the iron by electrolysis and again using the electrolyte as a solvent for dissolving the iron and alumina from the ore.

4. The method of treating an iron ore containing alumina, comprising dissolving the iron and alumina out of the ore with a suitable solvent, precipitating the alumina by the addition of a suitable chemical reagent, precipitating part of the iron by electrolysis, reducing the electrolyte whereby its acidity will be increased, and then using the electrolyte as a solvent for dissolving the iron and alumina from the ore.

5. The method of treating an iron ore containing alumina and manganese, comprising dissolving the iron, alumina and manganese out of the ore with a suitable solvent, precipitating the alumina by the addition of a suitable chemical reagent, and precipitating iron and manganese by electrolysis.

6. The method of treating an iron ore containing alumina and manganese comprising dissolving the iron, alumina and manganese out of the ore with a suitable solvent, reducing the solution, precipitating the alumina by the addition of a suitable chemical reagent, and precipitating iron and manganese by electrolysis.

7. The method of treating an iron ore containing alumina and manganese and nickel, comprising dissolving the iron, alumina, manganese and nickel out of the ore with a suitable solvent, precipitating the alumina by the addition of a suitable chemical reagent, and precipitating the iron, manganese and nickel by electrolysis.

8. The method of treating an iron ore containing alumina and manganese comprising dissolving the iron, alumina and manganese out of the ore with a suitable solvent, precipitating the alumina by the addition of a suitable chemical reagent, and precipitating part of the iron and manganese by electrolysis, reducing the electrolyte whereby its acidity will be increased, and then using the electrolyte as a solvent for dissolving the iron alumina and manganese from the ore.

9. The method of treating an iron ore containing alumina, comprising dissolving the iron and alumina out of the ore with a suitable solvent, dividing the solution in two parts and treating one part to precipitate alumina therefrom, reuniting the liquor from which the alumina has been precipitated with the other part of said solution, electrolyzing the solution to recover a portion of the iron therefrom, and again using the electrolyte as a solvent for dissolving the iron and alumina from the ore.

10. The method of treating an iron ore comprising dissolving the iron out of the ore with a solution containing chlorids, reducing the solution, and precipitating iron from the reduced solution by electrolysis.

11. The method of treating an iron ore comprising dissolving the iron out of the ore with a solution containing chlorids, reducing the solution with sulfur dioxid in the presence of calcium carbonate, and precipitating iron from the reduced solution by electrolysis.

12. The method of treating an iron ore comprising dissolving the iron out of the ore with a solution containing chlorids, reducing the solution with sulfur dioxid in the presence of calcium carbonate, adding ferrous sulfate to precipitate gypsum, and precipitating iron by electrolysis from the solution out of which the gypsum has been precipitated.

13. The method of treating an iron ore containing alumina, comprising dissolving the iron and alumina out of the ore with a solution containing chlorids, reducing the solution with sulfur dioxid in the presence of calcium carbonate, precipitating the alumina by the addition of a suitable chemical reagent, adding ferrous sulfate to precipitate gypsum, and precipitating iron by electrolysis from the solution out of which the gypsum has been precipitated.

14. The method of treating an iron ore containing alumina comprising dissolving the major part of the iron and alumina out of the ore together, reducing the solution, recovering the alumina from the reduced solution, and thereafter recovering iron.

15. The method of treating an iron ore containing alumina comprising dissolving the major part of the iron and alumina out of the ore together with a solution containing chlorids, reducing the solution with sulfur dioxid in the presence of calcium carbonate, recovering the alumina from the reduced solution, and thereafter recovering iron.

16. The method of treating an iron ore containing alumina comprising dissolving the major part of the iron and alumina out of the ore together, by means of a solvent which is also an electrolyte, reducing the solution, recovering the alumina from the reduced solution, and thereafter recovering iron by electrolysis.

17. The method of treating an iron ore containing chromium and alumina, comprising dissolving out the major part of the iron and alumina together, leaving the chromium as a residue, reducing the solution, recovering the alumina from the reduced solution, and thereafter recovering iron.

18. The method of treating an iron ore containing chromium and alumina, comprising dissolving out the major part of the iron and alumina together with a solution containing chlorids, leaving the chromium as a residue, reducing the solution with sulfur dioxid in the presence of calcium carbonate, J. L. FITZGERALD.
AUXILIARY BACKREST FOR AUTOMOBILES.
APPLICATION FILED AUG. 4, 1920.
1,377,823.
Patented May 10, 1921.
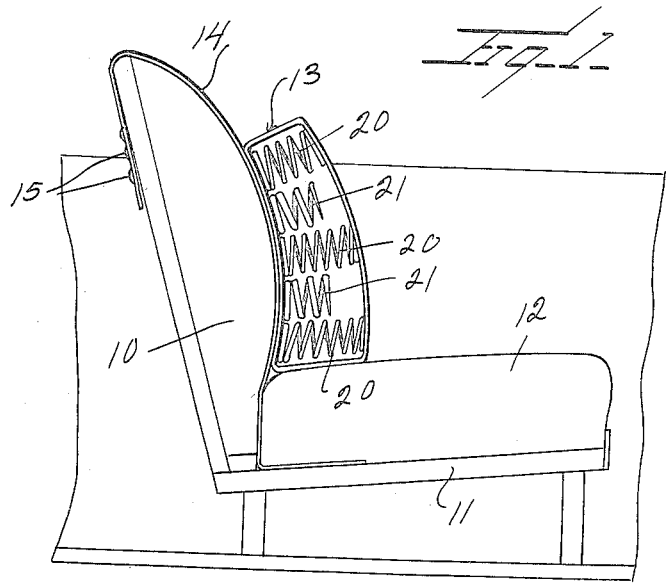
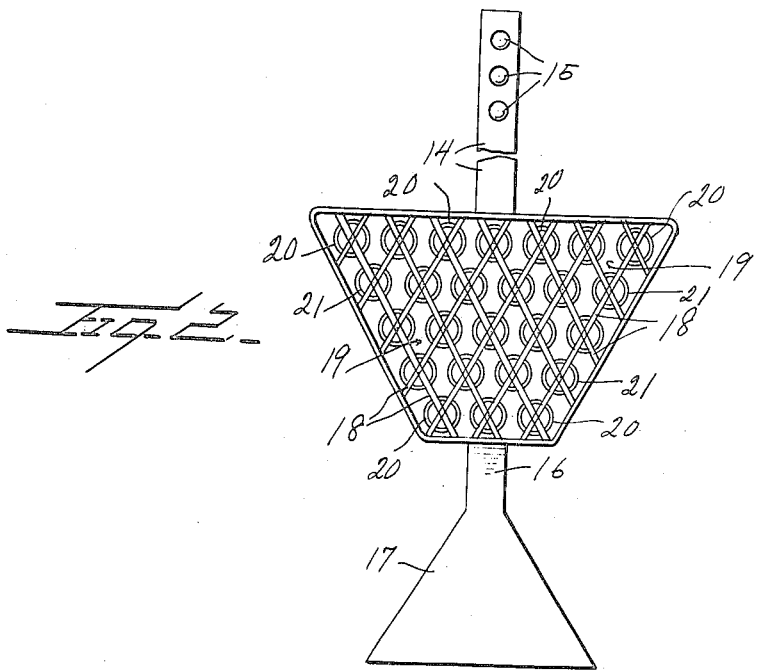
Inventor
J. L. Fitzgerald
By Watson E. Coleman
Attorney